(12) United States Patent
Murari et al.

(10) Patent No.: US 8,024,977 B2
(45) Date of Patent: Sep. 27, 2011

(54) PRESSURE SENSOR HAVING A HIGH FULL-SCALE VALUE WITH PACKAGE THEREOF

(75) Inventors: Bruno Murari, Monza (IT); Giulio Ricotti, Broni (IT); Luigi Della Torre, Lissone (IT); Andrea Lorenzo Vitali, Bergamo (IT)

(73) Assignee: STMicroelectronics S.r.l., Agrate Brianza (IT)

( * ) Notice: Subject to any disclaimer, the term of this patent is extended or adjusted under 35 U.S.C. 154(b) by 674 days.

(21) Appl. No.: 12/049,915

(22) Filed: Mar. 17, 2008

(65) Prior Publication Data

US 2008/0223143 A1 Sep. 18, 2008

Related U.S. Application Data

(63) Continuation-in-part of application No. PCT/IT2005/000529, filed on Sep. 16, 2005.

(51) Int. Cl.
*G01L 9/06* (2006.01)
(52) U.S. Cl. ........................................................ 73/727
(58) Field of Classification Search ........................ None
See application file for complete search history.

(56) References Cited

U.S. PATENT DOCUMENTS

| | | | |
|---|---|---|---|
| 4,944,187 A | 7/1990 | Frick et al. | |
| 4,993,143 A | 2/1991 | Sidner et al. | |
| 5,121,627 A * | 6/1992 | D'Aoust | 73/19.05 |
| 5,661,245 A | 8/1997 | Svoboda et al. | |
| 5,663,508 A * | 9/1997 | Sparks | 73/861.71 |
| 5,686,162 A * | 11/1997 | Polak et al. | 428/76 |
| 6,030,684 A * | 2/2000 | Polak et al. | 428/76 |
| 6,058,780 A | 5/2000 | Bernot et al. | |
| 7,463,819 B2 * | 12/2008 | Law et al. | 386/349 |
| 2004/0133322 A1 | 7/2004 | Chernoff et al. | |

FOREIGN PATENT DOCUMENTS

WO 9106125 A1 3/1991

* cited by examiner

*Primary Examiner* — Lisa Caputo
*Assistant Examiner* — Jermaine Jenkins
(74) *Attorney, Agent, or Firm* — Lisa K. Jorgenson; E. Russell Tarleton; Seed IP Law Group PLLC

(57) ABSTRACT

A pressure sensor including a pressure-sensor element having a monolithic body of semiconductor material, and a first main face and a second main face acting on which is a stress resulting from a pressure, the value of which is to be determined; and a package enclosing the pressure-sensor element. The package has an inner chamber containing liquid material, and the pressure-sensor element is arranged within the inner chamber in such a manner that the first and second main faces are both in contact with the liquid material. In particular, the liquid material is a silicone gel.

31 Claims, 3 Drawing Sheets

PRESSURE SENSOR HAVING A HIGH FULL-SCALE VALUE WITH PACKAGE THEREOF

BACKGROUND

1. Technical Field

The present disclosure relates to a pressure sensor having a high full-scale value with a package thereof and, in particular, in the following description explicit reference will be made, without implying any loss in generality, to use of the pressure sensor in an electromechanical braking system of the BBW (Brake By Wire) type.

2. Description of the Related Art

As is known, disc-braking systems of a traditional type for vehicles have a disc fixed to a respective wheel of the vehicle, a caliper associated with the disc, and a hydraulic control circuit. The caliper houses pads (generally two in number) made of friction material, and one or more pistons connected to the hydraulic control circuit. Due to pressure exerted by a user on the brake pedal, a pump in the hydraulic control circuit pressurizes a fluid contained in the circuit. Consequently, the pistons, which are equipped with appropriate seal elements, leave their respective seats and press the pads against the surface of the disc, thus exerting a braking action on the wheel.

Recently, systems have been proposed referred to as "Drive by Wire", which envisage electronic control of the main functions of a vehicle, for example the steering system, the clutch, and the braking system. In particular, braking systems with electronic control have been proposed, which envisage replacing the hydraulic calipers with actuators of an electromechanical type. In detail, appropriate sensors detect actuation of the brake pedal, and generate corresponding electrical signals, which are received and interpreted by an electronic control unit. The electronic control unit then controls intervention of the electromechanical actuators (for example, pistons actuated by an electric motor), which exert the braking action on the corresponding brake discs through the pads. The electronic control unit moreover receives from sensors associated with the braking system information on the braking action exerted by the electromechanical actuators so as to provide an appropriate closed-loop feedback control, for example, via a proportional-integral-derivative (PID) controller. In particular, the electronic control unit receives information on the pressure exerted by each actuator on the respective disc brake.

In order to measure the pressure, pressure sensors with a high full-scale value are necessary. In fact, the force with which the pads are pressed against the disc can assume values from 0 N up to a maximum value in the range of 15,000 N-35,000 N. The piston acting on the pads has a cross section in the region of 2 cm$^2$, so that the pressure sensors must operate up to full-scale values in the region of 1700 kg/cm$^2$ or more. Furthermore, it is advantageous to perform a pressure measurement with a dual measurement scale for measuring both low-pressure values with a first precision and high-pressures values with a second precision that is lower than the first precision.

The patent application PCT/IT05/00435, filed on Jul. 22, 2005, in the name of the present applicant, describes an integrated pressure-sensor element with a high full-scale value made with the monolithic-silicon technology.

More particularly, in detail (FIG. 1), the pressure-sensor element, designated by 1, comprises a monolithic body 2 made of semiconductor material, and has a first main surface 2a and a second main surface 2b opposite to one another. A stress resulting from a pressure P to be determined acts on both surfaces. The monolithic body 2 is solid and compact, is preferably made of monocrystalline silicon of an N type with (100) orientation of the crystallographic plane, and has a square cross section, for example, 800 μm×800 μm. The monolithic body 2 moreover has a thickness W (understood as distance between a first main outer surface thereof and a second main outer surface thereof that are opposite to one another) that is substantially uniform, for example, of 400 μm, and further comprises a bulk region 3 and piezoresistive detection elements 4. The piezoresistive detection elements 4 comprise doped regions, obtained, for example, by diffusion, and are made within a portion of the bulk region 3 arranged in the proximity of the first main surface 2a. In particular, the bulk region 3 is a solid and compact region (without empty spaces), having a respective thickness substantially equal to the thickness W. Furthermore, a passivation layer 5 (made, for example, of silicon oxide) coats the main outer surface of the monolithic body 2 adjacent to the piezoresistive detection elements 4.

The general operation of the pressure-sensor element 1 is based upon the so-called piezoresistive effect, whereby a stress applied to a piezoresistive material causes a variation of resistance thereof. In the case of semiconductor materials, such as silicon, the applied stress determines a deformation of the crystal lattice and hence an alteration of the mobility of the majority charge carriers. Deriving therefrom is a variation in the resistivity of piezoresistive elements formed in the semiconductor material. In particular, the pressure P determines a stress in a direction normal to the first main surface 2a, which causes a variation in the resistance of the piezoresistive detection elements 4. Said variation is detected by an appropriate Wheatstone-bridge measuring circuit (not illustrated) in order to determine the value of the pressure P.

The patent application PCT/IT05/00431 filed on Jul. 22, 2005, in the name of the present applicant, further describes an integrated pressure-sensor element with a high full-scale value and a double measurement scale, made with the monolithic-silicon technology.

More particularly, in detail (see FIG. 2), the pressure-sensor element, designated by 10, comprises a monolithic body 12 of semiconductor material, preferably monocrystalline silicon, and has a first main surface 12a and a second main surface 12b opposite to one another. A stress resulting from the pressure P, the value of which is to be determined, acts on both surfaces. The monolithic body 12 is preferably made of monocrystalline silicon of an N type with (100) orientation of the crystallographic plane, and has a square cross section, for example, 15 mm×15 mm, and a substantially uniform thickness W, for example, of 375 μm. The monolithic body 12 further comprises a bulk region 13 and a cavity 14, buried in the monolithic body 12.

For example, the cavity 14 can be formed with the manufacturing process described in patent application EP 04 425 197.3 filed in the name of the present applicant on Mar. 19, 2004.

In summary, said process initially envisages depositing on the monolithic body 12 a resist layer, which is then defined so as to form a mask. The mask has an area of an approximately square shape and comprises a plurality of hexagonal mask portions that define a honeycomb lattice. Then, through the mask, an anisotropic chemical etching of the monolithic body 12 is performed, following upon which trenches are formed, which communicate with one another and delimit a plurality of silicon pillars. In practice, the trenches form an open region of a complex shape in which the pillars extend. Next, the mask is removed and an epitaxial growth is performed in a deoxidizing environment. Consequently, an epitaxial layer grows above the pillars and closes the open region at the top. A step of thermal annealing is then carried out, which causes a migration of the silicon atoms, which tend to move into position of lower energy. Consequently, and also due to the small distance between the pillars, the silicon atoms migrate completely from the portions of the pillars within the open region, and the cavity 14 is consequently formed. A thin silicon layer remains above the cavity 14, constituted in part by epitaxially grown silicon atoms and in part by migrated silicon atoms, which forms a membrane 15.

The cavity 14 has, for example, a square cross section, 300 µm×300 µm, and a thickness of approximately 1 µm (in particular, the size of the cavity 14 is quite negligible as compared to the size of the monolithic body 12). The membrane 15, for example having the thickness of 0.5 µm, is laterally surrounded by the bulk region 13, is flexible and deforms as a function of the pressure P acting on the monolithic body 12. First piezoresistive detection elements 16 are provided within the membrane 15, and comprise doped regions, obtained, for example, by diffusion, the resistance of which varies as a function of the deformation of the membrane 15. The first piezoresistive detection elements 16 are connected in a first Wheatstone-bridge sensing circuit (not illustrated).

In a surface portion of the bulk region 13, in a position separated and distinct from the membrane 15, second piezoresistive detection elements 18 are provided, which also comprise doped regions, for example, obtained by diffusion, which are separated from the membrane 15 by a distance, for example not less than 50 µm, such as not to feel the effect of the stresses acting on the membrane 15 and of its deformation. In particular, the second piezoresistive detection elements 18 are integrated in a portion of the bulk region 13 that is solid and compact (without empty spaces), having a respective thickness substantially equal to the thickness W. Furthermore, the second piezoresistive detection elements 18 are connected in a second Wheatstone-bridge sensing circuit (not illustrated), distinct from the first sensing circuit. In particular, the second piezoresistive detection elements 18 are not electrically connected to the first piezoresistive detection elements 16. A focusing region 19a, of silicon oxide, is arranged on the monolithic body 12, at the membrane 15, so as to focus the pressure P on the membrane 15, forcing it to deform. Furthermore, a passivation layer 19b, which also is, for example, of silicon oxide, is arranged on the focusing region 19a.

Operation of the pressure-sensor element 10 is again based upon the piezoresistive effect of monocrystalline silicon. In particular, the pressure P to be measured determines a stress in a direction normal to the first main surface 12a, which causes a deformation of the membrane 15. Said deformation induces a longitudinal and transverse mechanical stress in the first piezoresistive detection elements 16, which undergo a variation of resistance, which is detected by the first Wheatstone-bridge sensing circuit. The pressure P moreover determines on each of the second piezoresistive detection elements 18 a transverse stress that determines a variation of their resistance, which can be detected by the second Wheatstone-bridge sensing circuit. In detail, for low values of the pressure P, the deformation of the second piezoresistive detection elements 18 is practically negligible. Instead, the membrane 15 is induced to deform by the focusing region 19a, causing a corresponding deformation of the first piezoresistive detection elements 16. As the pressure P increases, the deformation of the membrane 15 increases, until the membrane 15 contacts the bottom of the underlying cavity 14, thus saturating the pressure value supplied at output (in so far as no further deformations are possible). In particular, said saturation occurs for values of the pressure P in the range of around 10-15 kg/cm². At this point, a further increase in the pressure P starts affecting the entire outer surface of the monolithic body 12, causing a non-negligible variation in the resistance of the second piezoresistive detection elements 18 from which the value of the pressure P is obtained. The pressure-sensor element 10 thus has two independent and complementary measurement scales: a first measurement scale, which is valid for low values of the pressure P and has a full scale of around 10-15 kg/cm² (due to the action of the membrane 15 and of the first piezoresistive detection elements 16), and a second measurement scale, which is valid for high values of the pressure P and has a full scale of around 2000 kg/cm² (due to the action of the second piezoresistive detection elements 18). The first measurement scale is more precise than the second, given that the membrane 15 is sensitive to even minimal pressure variations.

In both of the described pressure sensors, given the crystalline nature of silicon and the high values of pressure involved, the presence of a first buffer layer and of a second buffer layer is necessary, said buffer layers being made of a solid elastic material, for example steel, and being arranged, respectively, on the first main surface 2a, 12a, and underneath the second main surface 2b, 12b of the pressure-sensor element 1, 10. The buffer layers have the function of uniformly distributing the applied pressure over all the useful surface, preventing any "focusing" that might cause cracks along the crystallographic axes. In FIG. 1 and FIG. 2, the first and second buffer layers are designated by 20a and 20b.

In detail, the first buffer layer 20a and the second buffer layer 20b require a high precision in the machining stage to guarantee absolute planarity of the respective faces in contact with the pressure-sensor element. In fact, as is schematically shown in FIG. 3, which refers by way of example to the pressure-sensor element 1 of FIG. 1, the presence of projecting asperities 21 on the face of the first buffer layer 20a and/or of the second buffer layer 20b set directly in contact with the pressure-sensor element 1 determines focusing of the applied pressure P in given points of the monolithic body 2, with the possibility of the silicon mechanical resistance being locally exceeded and of cracks 23 forming in the monolithic silicon body 2.

BRIEF SUMMARY

The present disclosure is directed to a pressure sensor with a high full-scale value and related package that will overcome the aforementioned problems and, in particular, in which the pressure P to be measured can be distributed uniformly and without risk of cracking the semiconductor material.

In accordance with one embodiment of the present disclosure, a pressure sensor is provided that includes a pressure-sensor element having a monolithic body of semiconductor material with a first main face and a second main face on which a stress resulting from a pressure, the value of which is to be determined, acts; and a package enclosing said pressure-sensor element, the package including an inner chamber containing liquid material, said pressure-sensor element arranged within said inner chamber in such a manner that said first main face and said second main face are both in contact with said liquid material.

In accordance with another aspect of the foregoing embodiment, the monolithic body has a sensitive region on which said pressure acts; the pressure sensor further comprising at least one high-pressure detection element, of a piezoresistive type, having a resistance that varies as a function of said pressure and formed in a portion of said sensitive region; said monolithic body having a thickness, and said portion of said sensitive region being solid and compact and having a respective thickness substantially equal to said thickness of the monolithic body.

In accordance with another embodiment of the present disclosure, a braking system is provided that includes a pressure sensor having a pressure-sensor element formed of a monolithic body of semiconductor material, and a first main face and a second main face on which a stress resulting from a pressure, the value of which is to be determined, acts; and a package enclosing said pressure-sensor element, the package comprising an inner chamber containing liquid material, said pressure-sensor element arranged within said inner chamber in such a manner that said first main face and said second main face are both in contact with said liquid material.

In accordance with another embodiment of the present disclosure, a device for sensing pressure is provided that includes a sensor formed of a monolithic body and having a first main face and an opposing second main face, the first main face including a compliant membrane adapted to respond to the pressure, the sensor having a circuit that generates an electric signal in response to the pressure applied to the compliant membrane; and a housing having an interior and a first wall that moves in response to the pressure, the interior configured to receive the sensor with the first main face adjacent the first wall of the housing, the housing having a contained liquid located between the first main face of the sensor and the first wall of the housing.

In accordance with another aspect of the foregoing embodiment, the device includes contained liquid located between the second main face of the sensor and a bottom wall of the housing.

In accordance with another aspect of the foregoing embodiment, the device includes the sensor being supported in the interior of the housing by a plurality of supporting elements so that the sensor is in contact only with the liquid and the supporting elements.

In accordance with another aspect of the foregoing embodiment, the device includes the first wall of the housing having a movable wall slidably received in the housing.

In accordance with another aspect of the foregoing embodiment, the device includes the movable wall having a compliant diaphragm.

BRIEF DESCRIPTION OF THE SEVERAL VIEWS OF THE DRAWINGS

For a better understanding of the present disclosure, preferred embodiments thereof are now described, purely by way of non-limiting example and with reference to the attached drawings, wherein.

DETAILED DESCRIPTION

Figure 4:
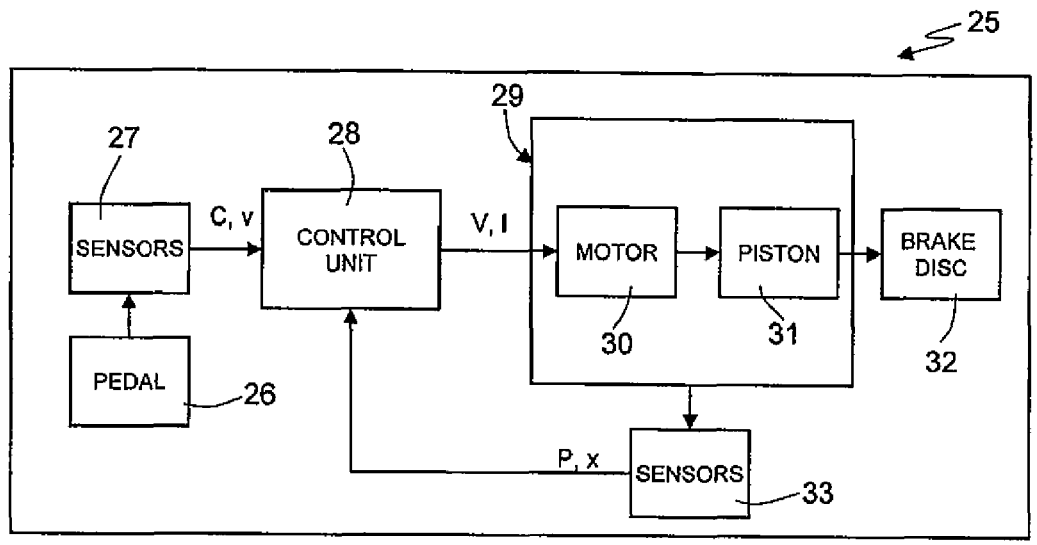
FIG. 4 shows a block diagram of a braking system of an electromechanical type.

FIG. 4 shows a braking system 25 of an electromechanical type (the so-called "Brake By Wire"), that includes a brake pedal 26, first sensors 27 configured to detect the travel and the speed of actuation of the brake pedal 26, an electronic control unit 28 connected to the first sensors 27, an electromechanical actuator 29 connected to the electronic control unit 28 and including an electric motor 30 and a piston 31 connected to the electric motor 30 by a connection element of the worm screw type (not illustrated), a disc brake 32 connected to the electromechanical actuator 29 and fixed to the wheel of a vehicle (in a known way that is not illustrated), and second sensors 33 configured to detect information regarding the braking action exerted by the electromechanical actuator 29 on the disc brake 32 and connected in feedback to the electronic control unit 28.

In use, the first sensors 27 send data regarding the travel C and the speed of actuation v of the brake pedal 26 to the electronic control unit 28, which, according to said data, generates a control signal (in voltage V or in current I) for the electromechanical actuator 29 (in particular, for the electric motor 30). As a function of said control signal, the electric motor 30 generates a torque that is transformed into a linear movement of the piston 31 by the connection element of the worm screw type. Consequently, the piston 31 presses against the disc brake 32 (via pads of abrasive material, not illustrated) so as to brake rotation thereof. The second sensors 33 detect the value of the pressure P exerted by the piston 31 on the disc brake 32 and the position x of the piston 31 with respect to the disc brake 32, and feed the data back to the electronic control unit 28. The electronic control unit 28 exerts in this way a closed-loop control (for example a PID control) of the braking action.

Figure 5:
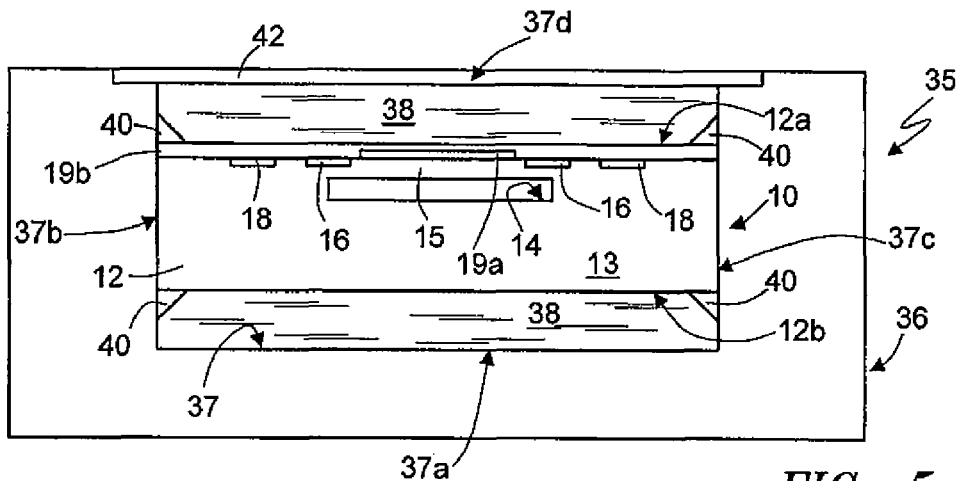
FIG. 5 shows a cross section of a pressure sensor with related package, according to a first embodiment of the present disclosure.

The second sensors 33 include a pressure sensor 35 (FIG. 5), which is made with the semiconductor technology and which is configured to measure the pressure P exerted by the piston 31 on the disc brake 32. As it is not illustrated, the pressure sensor 35 is housed in a casing of the electromechanical actuator 29 and is configured in such a manner that it is sensitive to the pressure P exerted by the piston 31.

In detail, the pressure sensor 35 includes a pressure-sensor element 10, made in a way similar to what has been described with reference to FIG. 2 (so that parts that are similar are designated by the same reference numbers), and a package 36, for example made of steel or special steel, which encloses the pressure-sensor element 10.

According to an aspect of the present disclosure, the package 36 has an inner chamber 37, which is completely filled with a liquid material 38 and houses the pressure-sensor element 10. In detail, the inner chamber 37 has a bottom wall 37a, side walls 37b, 37c and a top wall 37d. The pressure-sensor element 10 is anchored to the side walls 37b, 37c by means of appropriate anchorages 40. In particular, the anchorages 40, for example, made of resin or glue, anchor the first and second main surfaces 12a, 12b of the pressure-sensor element to the side walls 37b, 37c, and, advantageously, are configured in such a manner that the pressure-sensor element 10 is laterally arranged in contact with the side walls 37a, 37c of the inner chamber 37. The top wall 37d of the inner chamber 37 is constituted by a deformable diaphragm 42, for example made of steel or of ceramic material, which moreover defines part of a top main surface of the package 36.

Conveniently, the liquid material 38 has a low Young's modulus and a high viscosity. For example, the liquid material 38 can be a silicone polymer, e.g., a silicone gel or oil, such as the product Fluorogel™ Q3-6679 manufactured by the company Dow Corning™.

In use, the diaphragm 42 and the liquid material 38 transmit the pressure P within the package 36 to the pressure-sensor element 10. In particular, the liquid material 38 uniformly distributes the pressure P over the first and second main surfaces 12a, 12b of the pressure-sensor element 10. The anchorages 40 have the function of supporting the monolithic body 12 of the pressure-sensor element 10, at the same time enabling its deformation as a function of the pressure P. Since the monolithic body 12 is in lateral contact with the side walls 37b, 37c of the inner chamber 37, the pressure basically determines a stress in the transverse direction on the first and second main surfaces 12a, 12b. Said deformation, as previously described, causes the resistive variation of the first and second piezoresistive detection elements 16, 18, which is detected by an appropriate bridge measuring sense circuit to determine the pressure P applied.

It should be noted in particular that the first and second main surfaces 12a, 12b are directly in contact with the liquid material 38 and do not have points of contact with the bottom and top walls 37a, 37d of the inner chamber 37. In this way, there does not exist the possibility of projecting asperities or other imperfections of the internal walls of the package 36 determining points of focusing of the pressure and consequent cracks in the monolithic body 12.

Figure 6:
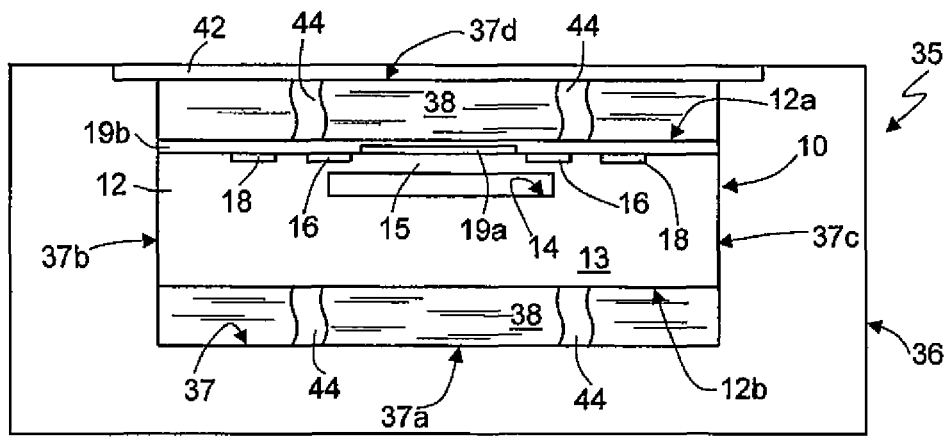
FIG. 6 shows a variation of the pressure sensor of FIG. 5.

FIG. 6 shows a variation of the pressure sensor 35, wherein the support of the pressure-sensor element 10 within the inner chamber 37 filled with the liquid material 38 is ensured by means of flexible pillars 44. In detail, the flexible pillars 44, made, for example, of silicon, connect the first and second main surfaces 12a, 12b, respectively, to the top wall and bottom wall 37d, 37a of the inner chamber 37. Also in this case, the liquid material 38 uniformly distributes the pressure P over the first and second main surfaces 12a, 12b, and the flexible pillars 44 support the monolithic body 12, at the same time enabling its deformation as a function of the pressure P.

Figure 7:
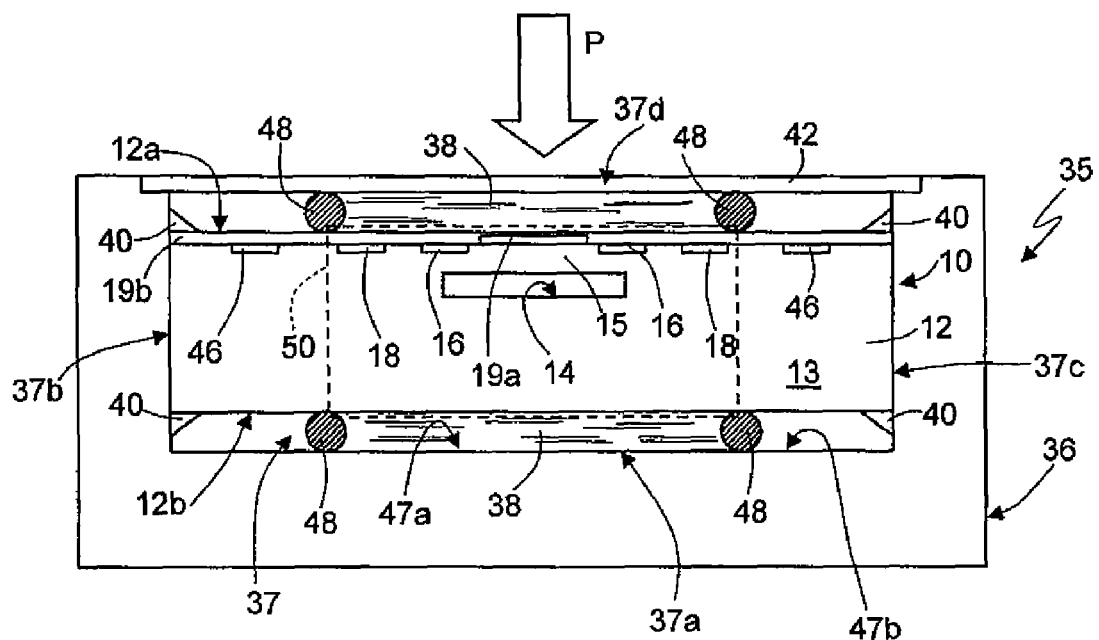
FIG. 7 shows a cross section of a pressure sensor with related package, according to a second embodiment of the present disclosure.

FIG. 7 shows a second embodiment of the pressure sensor 35. In this case, the monolithic body 12 comprises piezoresistive reference elements 46 made in a portion of the bulk region 13, arranged in the proximity of the first main surface 12a, and distinct and separated from a pressure-sensitive portion 50 of the monolithic body 12, which integrates the first and second piezoresistive detection elements 16, 18. In particular, the piezoresistive reference elements 46 are connected together to the second piezoresistive detection elements 18 in the second Wheatstone-bridge sensing circuit.

The inner chamber 37 is in this case not completely filled with liquid material, and has a central portion 47a, which is filled with the liquid material 38, and an outer portion 47b, which instead is not occupied by the liquid material 38. Sealing elements 48 made of sealing material (for example, glue or silicone resin) separate in a fluid-tight manner the central portion 47a from the outer portion 47b. Also in this case, anchorages 40 are provided for supporting the pressure-sensor element 10 within the inner chamber 37 (or, in a way that is equivalent and is not illustrated, the flexible pillars 44 are provided for said function).

In use, the pressure P is uniformly distributed only over the pressure-sensitive portion 50 of the monolithic body 12, arranged within the central portion 47a of the inner chamber 37, whereas outside said pressure-sensitive portion 50 the pressure is substantially zero. The first and second piezoresistive detection elements 16, 18 consequently feel the effects of the pressure P applied, whilst the piezoresistive reference elements 46 do not undergo any resistive variations as a function of the pressure P. At the same time, the piezoresistive reference elements 46 are subject to the same environmental parameters (for example, temperature) to which the second piezoresistive detection elements 18 are subject. Advantageously, by appropriately connecting the second piezoresistive detection elements 18 and the piezoresistive reference elements 46 in the second Wheatstone-bridge sensing circuit, it is possible to perform a differential measurement in which the resistance variations due to the aforesaid environmental parameters are cancelled so as to render the measured value of the pressure P insensitive to said parameters.

In the second embodiment described, it is important to size appropriately the central portion 47a of the inner chamber 37 (and consequently the pressure-sensitive portion 50) in such a way that the pressure P is distributed over a sufficiently large area of the monolithic body 12, i.e., over an area such that the pressure per unit area will not exceed the physical limits of failure of silicon.

Figure 8:
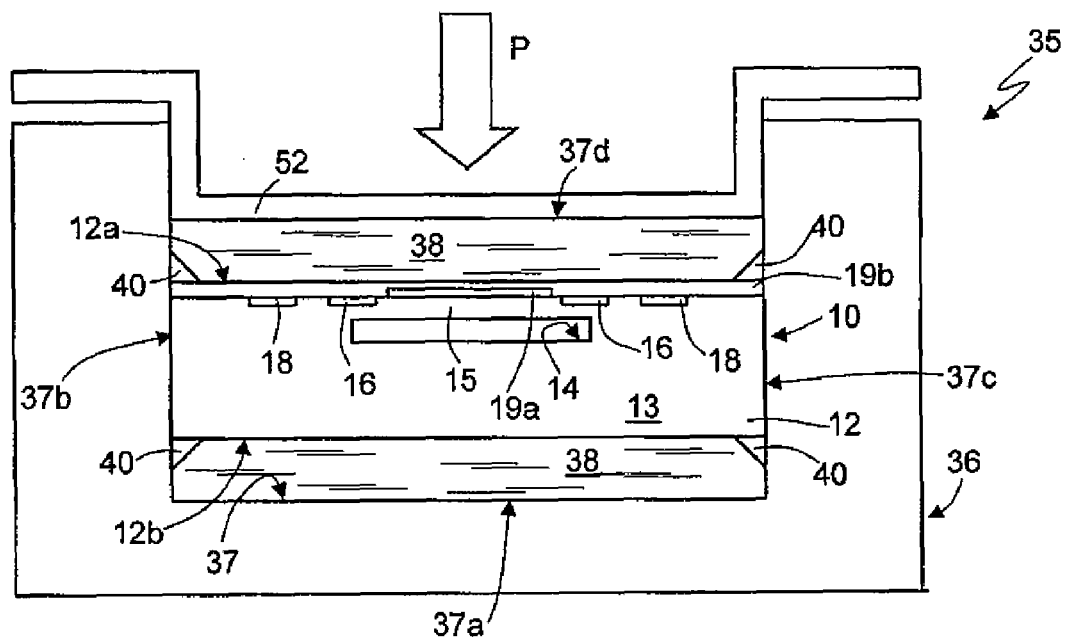
FIG. 8 shows a cross section of a pressure sensor with related package, according to a third embodiment of the present disclosure.

FIG. 8 shows a third embodiment of the pressure sensor 35. The top wall 37d of the inner chamber 37 is not constituted by the diaphragm 42, but rather by a mobile wall 52, for example made of steel or special steel, which is free to slide along the side walls 37b, 37c as a function of the applied pressure P, generating a corresponding pressure within the chamber 37, which is transferred to the pressure-sensor element 10 through the liquid material 38. Said solution can prove advantageous when extremely high values of the pressure P are to be measured. In fact, the diaphragm 42 of FIGS. 5-7, for high values of the pressure P, can preserve a certain memory of the deformation that it has undergone, which in time can lead to measurement errors of the pressure P. Said problem does not occur when use is made of the mobile wall 52.

The described pressure sensor has numerous advantages.

First, as previously highlighted, the use of a liquid material 38 within the package 36 enables uniform distribution of the pressure P to be measured over the first and second main surfaces 12a, 12b of the pressure-sensor element 10, without any need for the presence of buffer layers in contact with the first and second main surfaces 12a, 12b. In this way, no points of focusing of the pressure, which might lead to breaking of the monolithic body 12, are created. In fact, the pressure-sensor element 10 is immersed in the liquid material 38, and the first and second main surfaces 12a, 12b do not come into contact with the internal walls of the package 36, since they are exclusively in contact with the liquid material 38 and with the anchorages 40 or supports 44.

A further advantageous feature is the fact that the monolithic body 12 is arranged laterally in contact with the side walls 37b, 37c of the inner chamber 37, in such a manner that the pressure will not determine any stresses in the longitudinal direction in the monolithic body 12, which otherwise would have to be taken into account in the sensing circuits (with obvious complications in the circuitry thereof).

Furthermore, as previously emphasized, the solution that envisages the use of a mobile wall 52 proves advantageous when it is necessary to measure high values of the pressure P, in order to reduce measurement errors and increase the life of the pressure sensor.

Finally, it is clear that modifications and variations may be made to what is described and illustrated herein, without thereby departing from the scope of the present disclosure, as defined in the appended claims.

In particular, a different liquid material 38 could be used for filling the inner chamber 37, for example a fluid of the type used in hydraulic circuits of braking systems.

The inner chamber 37, or the central portion 47a thereof, could even be just partially filled by the liquid material 38 (the liquid material 38 is in any case set in direct contact with the first and second main surfaces 12a, 12b of the pressure-sensor element).

Furthermore, the pressure-sensor element 10 can be supported in a different way within the inner chamber 37. For example, the simultaneous use of the anchorages 40 and of the flexible pillars 44 can be envisaged. Said anchorages 40 and flexible pillars 44 can be made of materials other than the ones described above.

Figure 1:
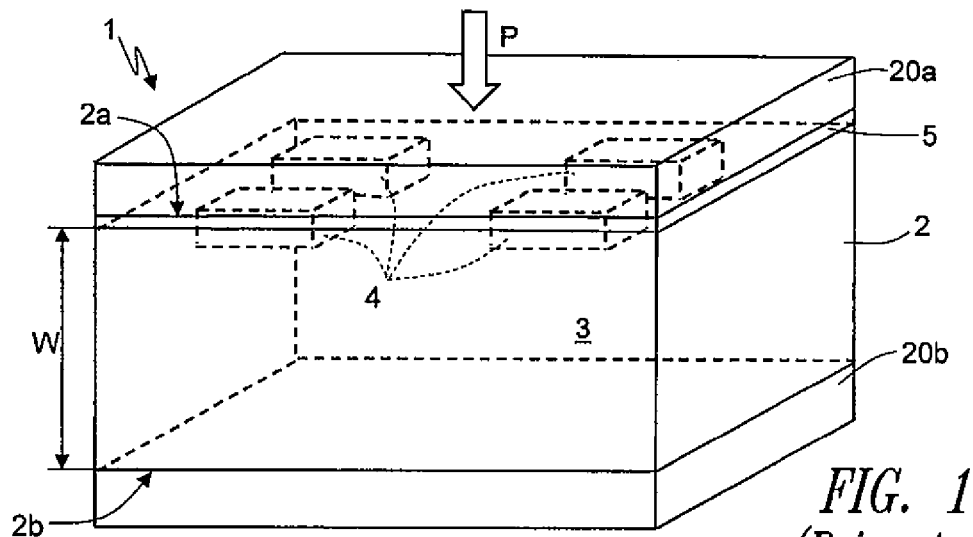
FIG. 1 shows a perspective section of a pressure-sensor element of a known type.
Figure 2:
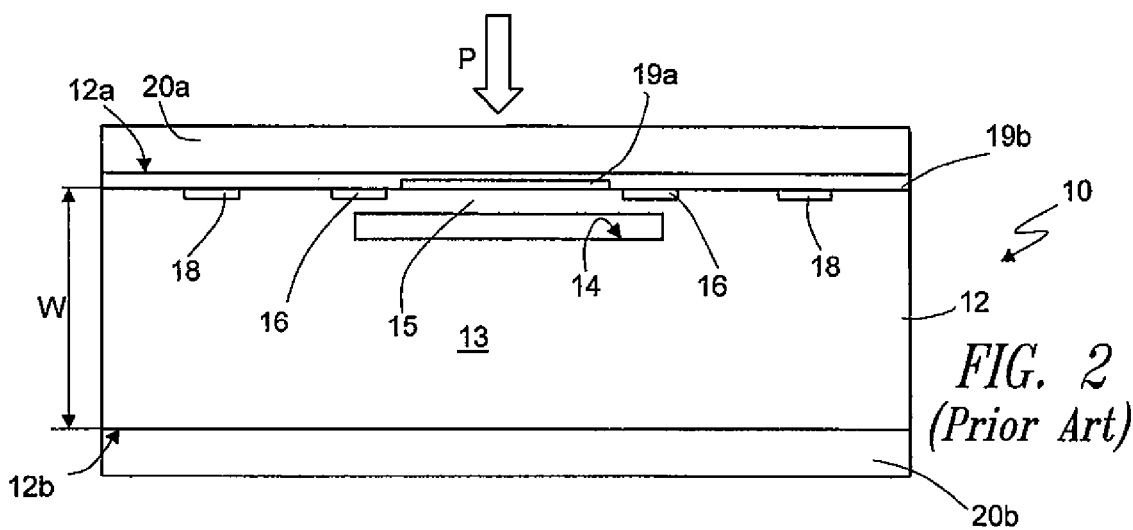
FIG. 2 shows a cross section of a different pressure-sensor element of a known type.
Figure 3:
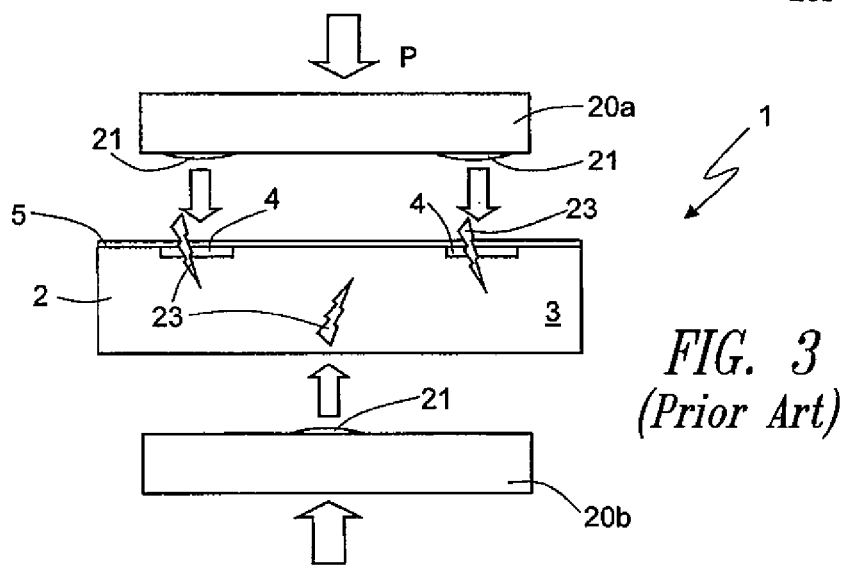
FIG. 3 is a schematic illustration of the formation of cracks in the pressure-sensor element of FIG. 1.

Even though the entire description has been made with reference to a pressure sensor having the pressure-sensor element 10 described in FIG. 2, it is clear that the disclosure applies without any changes to a pressure-sensor element 1 of the type described in FIG. 1, i.e., provided with just one measurement scale (on account of the presence of just the piezoresistive detection elements 4 within the bulk region 3 of the monolithic body 2, and the absence of the cavity and membrane).

The sensing circuit associated with the pressure sensor can be integrated within the same monolithic body 12 so as to provide a pressure measuring device integrated in a single chip.

Finally, it is clear that the pressure sensor 35 can advantageously be used also in applications that envisage measurement of high pressures, other than the braking system described.

The various embodiments described above can be combined to provide further embodiments. All of the U.S. patents, U.S. patent application publications, U.S. patent applications, foreign patents, foreign patent applications and non-patent publications referred to in this specification and/or listed in the Application Data Sheet, are incorporated herein by reference, in their entirety. Aspects of the embodiments can be modified, if necessary to employ concepts of the various patents, applications and publications to provide yet further embodiments.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A pressure sensor for use with liquid material, comprising:
a pressure-sensor element having a monolithic body of semiconductor material, a first side face, a second side face, a first main face, and a second main face, the pressure-sensor element structured to sense a pressure on the second main face; and
a package structured to enclose the pressure-sensor element, the package including an inner chamber having opposing side walls, a top wall, and a bottom wall and structured to contain the liquid material, the pressure-sensor element arranged within the inner chamber in such a manner that the first and second side faces are in contact with the respective opposing side walls of the chamber so that the liquid material will be in contact with both the first main face and the second main face.

2. The pressure sensor according to claim 1, wherein the monolithic body has a sensitive region on which the pressure is sensed; the pressure sensor further including at least one high-pressure detection element of a piezoresistive type having a resistance that varies as a function of the sensed pressure and formed in a portion of the sensitive region; the monolithic body having a thickness, and the portion of the sensitive region being solid and having a respective thickness substantially equal to the thickness of the monolithic body.

3. The pressure sensor according to claim 2, wherein the thickness is substantially constant.

4. The pressure sensor according to claim 2, further including: a cavity contained and completely isolated within the monolithic body and surmounted by a membrane that is flexible and deformable as a function of the sensed pressure, the membrane arranged within the sensitive region and laterally surrounded by the portion of the sensitive region; and at least one low-pressure detection element of a piezoresistive type integrated in the membrane and having a resistance that varies as a function of the deformation of the membrane, the high-pressure detection element and the low-pressure detection element not being electrically connected to one another.

5. The pressure sensor according to claim 4, wherein the membrane is arranged in a central position with respect to the sensitive region, and the sensitive region is arranged in a central position with respect to the monolithic body.

6. The pressure sensor according to claim 1, wherein the inner chamber is structured to be completely filled with the liquid material.

7. The pressure sensor according to claim 1, wherein the pressure-sensor element is supported within the inner chamber by supporting elements; of which the first main face and the second main face both in contact with the supporting elements.

8. The pressure sensor according to claim 7, wherein the supporting elements include anchorages arranged between the first and second main faces and the side walls; the anchorages configured in such a manner that the monolithic body is arranged laterally in contact with the side walls.

9. The pressure sensor according to claim 7, wherein the top wall and bottom wall respectively face the first main face and the second main face, and the supporting elements are pillars arranged between the first and second main faces and, respectively, the top wall and the bottom wall, the pillars configured in such a manner that the monolithic body is arranged laterally in contact with the side walls.

10. The pressure sensor according to claim 1, wherein the top wall faces the first main face; the top wall made of a deformable diaphragm defining part of a top main surface of the package on which pressure is sensed.

11. The pressure sensor according to claim 1, wherein the inner chamber top wall faces the first main face, the top wall made of a mobile wall defining part of a top main surface of the package on which pressure is sensed, the mobile wall structured to move with respect to the side walls of the chamber.

12. The pressure sensor according to claim 1, further including at least one reference element of a piezoresistive type, integrated in a reference portion of the monolithic body separated and distinct from the sensitive region; the reference element electrically connected to the pressure sensing element and having a resistance that remains constant as the sensed pressure varies.

13. The pressure sensor according to claim 12, wherein the inner chamber includes a central portion structured to be filled with the liquid material and an outer portion, which is empty and is separated in a fluid-tight manner from the central portion by means of sealing elements; the sensitive region arranged within the central portion of the inner chamber, and the reference portion of the monolithic body arranged within the outer portion of the inner chamber.

14. A braking system, comprising:
   a pressure sensor having a pressure-sensor element formed of a monolithic body of semiconductor material with a first main face, a second main face, and first and second opposing side faces, the pressure-sensor element structured to sense a pressure on the second main face; and
   a package enclosing the pressure-sensor element, the package having an inner chamber having a top wall, a bottom wall, and opposing first and second side walls, the inner chamber containing liquid material, the pressure-sensor element arranged within the inner chamber in such a manner that the first and second side faces are in contact with the first and second side walls and the first main face and the second main face are both in contact with the liquid material.

15. The system according to claim 14, comprising a disc brake, an electronic control unit, and an electromechanical actuator structured to exert a braking action on the disc brake in response to control signals generated by the electronic control unit; wherein the pressure sensor is structured to perform a measurement of the pressure exerted by the electromechanical actuator on the disc brake, and is coupled to the electronic control unit and structured to feed the measurement back thereto.

16. A device for sensing pressure, comprising:
   a sensor formed of a monolithic body having opposing first and second side faces, a first main face and an opposing second main face, the first main face having a compliant membrane adapted to respond to the pressure, the sensor having a circuit structured to generate an electric signal in response to the pressure applied to the compliant membrane; and
   a housing having an interior chamber and a first wall structured to move in response to the pressure, the interior chamber having opposing first and second side walls and configured to receive the sensor with the first main face facing the first wall of the housing and the first and second side faces in contact with the first and second side walls, the housing structured to contain liquid in the chamber to transmit pressure between the first main face of the sensor and the first wall of the housing.

17. The device of claim 16, further comprising contained liquid located between the second main face of the sensor and a bottom wall of the housing.

18. The device of claim 17, wherein the sensor is supported in the interior of the housing by a plurality of supporting elements so that the sensor is in contact only with the liquid and the supporting elements.

19. The device of claim 16, wherein the first wall of the housing comprises a movable wall slidably received in the housing.

20. The device of claim 16, wherein the movable wall comprises a compliant diaphragm.

21. A pressure sensor for use with liquid material, comprising:
   a pressure-sensor element having a monolithic body of semiconductor material, a first main face, and a second main face, the pressure-sensor element structured to sense a pressure on the second main face, the monolithic body having a sensitive region on which the pressure acts, the pressure-sensor element further including at least one high-pressure detection element of a piezoresistive type and having a resistance that varies as a function of the sensed pressure and structured in a portion of the sensitive region, the monolithic body having a thickness, and the portion of the sensitive region being solid and having a respective thickness substantially equal to the thickness of the monolithic body, the monolithic body further including a cavity contained and completely isolated within the monolithic body and surrounded by a membrane that is flexible and deformable as a function of the sensed pressure, the membrane arranged within the sensitive region and laterally surrounded by the portion of the sensitive region, and at least one low-pressure detection element of a piezoresistive type integrated in the membrane and having a resistance that varies as a function of the deformation of the membrane, the high-pressure detection element and the low-pressure detection element not being electrically connected to one another; and
   a package structured to enclose the pressure-sensor element, the package including an inner chamber structured to contain the liquid material, the pressure-sensor element arranged within the inner chamber in such a manner that the first main face and the second main face can be in contact with the liquid material when the liquid material is in the inner chamber.

22. The pressure sensor of claim 21, wherein the membrane is arranged in a central position with respect to the sensitive region, and the sensitive region is arranged in a central position with respect to the monolithic body.

23. The pressure sensor of claim 21, wherein the pressure-sensor element is supported within the inner chamber by supporting elements, the first main face and the second main face both in contact with the supporting elements.

24. A pressure sensor for use with liquid material, comprising:
   a pressure-sensor element having a monolithic body of semiconductor material, a first main face, and a second main face, the pressure-sensor element structured to sense a pressure on the second main face;
   a package structured to enclose the pressure-sensor element, the package including an inner chamber structured to contain the liquid material, the pressure-sensor element arranged within the inner chamber in such a manner that the first main face and the second main face will be in contact with the liquid material when the liquid material is in the chamber; and
   a plurality of supporting elements structured to support the pressure-sensor element within the inner chamber, the first main face and the second main face both in contact with the supporting elements, the supporting elements including anchorages arranged between the first and second main faces and side walls of the inner chamber, the anchorages configured to support the monolithic body in a laterally arrangement in contact with the chamber side walls.

25. The pressure sensor of claim 24, wherein the inner chamber has a top wall facing the first main face, the top wall structured of a deformable diaphragm defining part of a top main surface of the package on which pressure is sensed.

26. The pressure sensor of claim 24, wherein the inner chamber has a top wall facing the first main face, the top wall made of a mobile wall defining part of a top main surface of the package on which pressure is sensed, the mobile wall structured to move with respect to the side walls of the chamber.

27. The pressure sensor of claim 24, further including at least one reference element of a piezoresistive type integrated in a reference portion of the monolithic body and separated and distinct from the sensitive region, the reference element electrically connected to the pressure sensing element and having a resistance structured to remain constant as the sensed pressure varies.

28. A pressure sensor for use with liquid material, comprising:
- a pressure-sensor element having a monolithic body of semiconductor material, a first main face, and a second main face, the pressure-sensor element structured to sense a pressure on the second main face;
- a package structured to enclose the pressure-sensor element, the package including an inner chamber structured to contain the liquid material, the pressure-sensor element arranged within the inner chamber in such a manner that the first main face and the second main face will be in contact with the liquid material when the liquid material is in the chamber; and
- a plurality of supporting elements structured to support the pressure-sensor element within the inner chamber, the first main face and the second main face both in contact with the supporting elements, the supporting elements are structured as pillars arranged between the first and second main faces and, respectively, a top wall and bottom wall of the chamber, the pillars configured in such a manner that the monolithic body is arranged laterally in contact with side walls of the chamber.

29. The pressure sensor of claim 28, wherein the inner chamber has a top wall facing the first main face, the top wall structured of a deformable diaphragm defining part of a top main surface of the package on which pressure is sensed.

30. The pressure sensor of claim 28, wherein the inner chamber has a top wall facing the first main face, the top wall made of a mobile wall defining part of a top main surface of the package on which pressure is sensed, the mobile wall structured to move with respect to the side walls of the chamber.

31. The pressure sensor of claim 28, further including at least one reference element of a piezoresistive type integrated in a reference portion of the monolithic body and separated and distinct from the sensitive region, the reference element electrically connected to the pressure sensing element and having a resistance structured to remain constant as the sensed pressure varies.

* * * * *